No. 701,245. Patented May 27, 1902.
F. H. ANDERSON.
PEDAL BALANCE.
(Application filed Apr. 9, 1901.)
(No Model.)
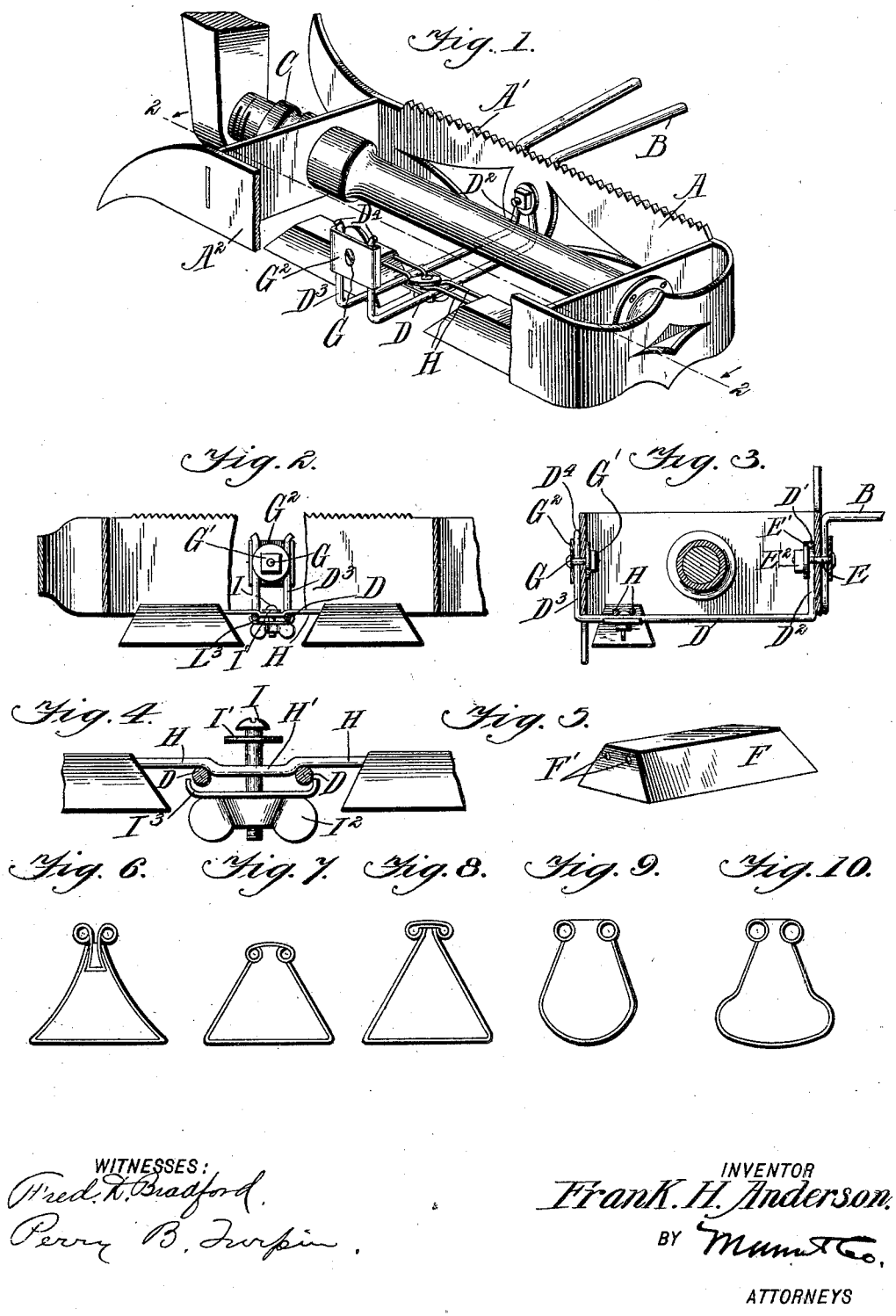
WITNESSES:
Fred L. Bradford.
Perry B. Turpin.
INVENTOR
Frank H. Anderson.
BY Munn & Co.
ATTORNEYS

UNITED STATES PATENT OFFICE.

FRANK HENRY ANDERSON, OF WALHALLA, NORTH DAKOTA.

PEDAL-BALANCE.

SPECIFICATION forming part of Letters Patent No. 701,245, dated May 27, 1902.

Application filed April 9, 1901. Serial No. 55,003. (No model.)

*To all whom it may concern:*

Be it known that I, FRANK HENRY ANDERSON, residing at Walhalla, in the county of Pembina and State of North Dakota, have made certain new and useful Improvements in Pedal-Balances, of which the following is a specification.

My invention is an improvement in pedal-balances, and has for an object to provide a simple construction whereby to balance a pedal provided with a toe-clip or one which has no toe-clip attached, but is especially intended for use in connection with a toe-clip to properly balance the pedal and prevent its being turned by the weight of such clip; and the invention consists in certain novel constructions and combinations of parts, as will be hereinafter described and claimed.

In the drawings, Figure 1 is a perspective view, partly broken away, of a pedal provided with my improvements. Fig. 2 is a longitudinal section on about line 2 2 of Fig. 1. Fig. 3 is a cross-section of the pedal. Fig. 4 is a detail section showing the weights and the means for supporting the same. Fig. 5 is a detail view of one of the balancing-weights; and Figs. 6 to 10, inclusive, show different forms of such weight.

The pedal A and the toe-clip B may be of any desired construction, the pedal being suitably journaled to turn upon the crank-pin C of the bicycle. In connection with such pedal I employ the balancing-weight, which is adjustable back and forth to properly balance the pedal and preserve the same in position to receive the foot of the rider.

In the construction shown I employ supporting-rods D, which extend parallel to each other below the axis of the pedal and from front to rear of such pedal, as shown in Figs. 1 and 3. As shown and preferred, the rods D are portions of a suitable length of wire which is doubled upon itself at D' and is bent to form the upturned wings $D^2$, which lap against the inner side of the front plate A' of the pedal and the upturned wings $D^3$ at the free ends of said length of wire and which extend up along the outer side of the rear plate $A^2$ of the pedal, as shown in Fig. 3. In securing the supporting-rods D the upturned front end $D'$ $D^2$ fits over a bolt E, which is supplied with a washer E' and a nut $E^2$, the washer E' lapping over the wings $D^2$ and the nut operating to secure the front end of the supporting-rods, as will be understood from Figs. 1 and 3. I prefer to employ the same bolt E for securing the toe-clip B in place, as will be understood from Figs. 1 and 3. The weights F are carried by the rods D at a point between the front and rear plates A' and $A^2$ of the pedal, and the upturned rear ends of the rods D are held to the rear plate $A^2$ by means of the bolt G, having a nut G', and a washer $G^2$, which overlaps the wings $D^3$, the ends $D^4$ being bent slightly outward to prevent the slipping of the wings $D^3$ out of the box-like washer $G^2$, as will be understood from Figs. 1 and 2. By the described construction the supporting-rods D are secured to the pedal in such manner as to permit their convenient application and removal whenever desired. The weights F are provided with seats F' for the carrier-rods H. These seats may be openings formed in the body of the weight, as shown in Fig. 5, or they may be portions of plates connected with the body of the weight, as shown in Figs. 6 to 10, inclusive, in which I illustrate different forms of weights. The weights shown in these figures are composed of lead or other body portions and plates molded in connection with the body portions.

The carrier-rods H extend over the supporting-rods D and are provided at their middles with depressed portions H', which fit between the rods D, form seats for the upper washer of the fastening-bolt, and also prevent any endwise movement of the carrier-rods when their fastening-nut is tightened up. As will be understood from Figs. 1, 2, and 4, the weights F are carried on the opposite ends of the rods H, and the said rods are supported at their middles on the supporting-rods, which extend from front to rear of the pedal.

The bolt I passes between the carrier-rods H and also between the supporting-rods D and is provided with a washer I', which bears upon the carrier-rods and within the depressed portions H' thereof, and the screw I is also provided between its nut $I^2$ and the supporting-rods D with a washer-plate $I^3$, whose edges are upturned along the outer sides of the rods D. By this construction, which is best shown in Fig. 4, the carrier-rod may be held in any adjustment along the supporting-rods D, and can thus be adjusted to properly balance the pedal.

In practice my improvement provides a balance for the pedal by which to always keep it at the desired angle whether it be supplied with the toe-clip or not, and the invention will be found especially useful by ladies, whose skirts prevent them from seeing the pedal, as it will always hold the pedal in position to receive the foot. By holding the pedal in position with the clip up the invention serves to prevent injury to the clip by its striking against the ground in coasting or when the wheel is being led. By supporting the weights on the free ends of rods which are supported between their ends the inherent resilience of the rods operates to avoid the dead-weight action of the weights while the bicycle is being propelled, as will be understood from Figs. 1, 2, and 4 of the drawings.

Having thus described my invention, what I claim as new, and desire to secure by Letters Patent, is—

1. A pedal-balance substantially as shown and described comprising the supporting-rods, means for connecting them with the pedal, the weight-carrying rods extending at right angles to and across the supporting-rod and having deflected portions fitting between said supporting-rods, the screw passed through the space between the supporting and carrier rods, the nut and washers for securing the carrier-rods and supporting-rods together, and the weights on the carrier-rods on opposite sides of the supporting-rods substantially as set forth.

2. A pedal-balance substantially as described comprising the parallel supporting-rods, the parallel weight-carrying rods crossing the supporting-rods at a right angle, the weights on the carrying-rods, means for securing the carrying-rods to the supporting-rods and means for securing the supporting-rods to the pedal-frame substantially as set forth.

3. The combination of the parallel supporting-rods spaced apart, the parallel carrier-rods crossing the supporting-rods and having depressed portions between the supporting-rods, the weights on the carrier-rods, and the connecting devices for securing the carrier-rods to the supporting-rods substantially as set forth.

4. The combination with the front and rear plates of the pedal, of the supporting-rods formed from a length of wire bent upon itself and having its bent end upturned forming wings lapped alongside and secured to the front plate of the pedal, the rear ends of the arms or rods being upturned forming wings secured to the rear plate of the pedal, the weight-carrying rods secured between their ends to the supporting-rods and the weights on the carrying-rods on opposite sides of the supporting-rods substantially as set forth.

5. The combination of the supporting-rods, the carrier-rods crossing the same at right angles and adjustable along the supporting-rods, and the weights having openings to receive the ends of the carrier-rods and carried thereby on opposite sides of the supporting-rods substantially as set forth.

FRANK HENRY ANDERSON.

Witnesses:
J. H. ANDERSON,
WM. H. WEGNER.